(12) United States Patent
Storteboom et al.

(10) Patent No.: US 8,627,773 B2
(45) Date of Patent: Jan. 14, 2014

(54) T1 LEAD-BOARD FOR A SHIPPING PLATFORM

(71) Applicant: CHEP Technology Pty Limited, Sydney, NSW (AU)

(72) Inventors: John Thomas Storteboom, Orlando, FL (US); Oivind Brockmeier, Medford, MA (US); Brandon M. D'Emidio, Orlando, FL (US); Timothy R. Proulx, Nashua, NH (US); Gregory S. Burkett, Cambridge, MA (US); Jeffrey R. Chapin, Cambridge, MA (US); Kenneth M. Brandt, Orlando, FL (US)

(73) Assignee: CHEP Technology Pty Limited, Sydney NSW (AU)

( * ) Notice: Subject to any disclaimer, the term of this patent is extended or adjusted under 35 U.S.C. 154(b) by 0 days.

(21) Appl. No.: 13/716,093

(22) Filed: Dec. 15, 2012

(65) Prior Publication Data

US 2013/0152831 A1 Jun. 20, 2013

Related U.S. Application Data

(60) Provisional application No. 61/576,987, filed on Dec. 17, 2011.

(51) Int. Cl.
*B65D 19/00* (2006.01)
(52) U.S. Cl.
USPC .................................... 108/51.11; 108/56.1

(58) Field of Classification Search
USPC .......... 108/51.11, 57.25, 901, 902, 56.1, 56.3
See application file for complete search history.

(56) References Cited

U.S. PATENT DOCUMENTS

| | | | | |
|---|---|---|---|---|
| 2,503,022 | A * | 4/1950 | Benoist et al. | 108/57.17 |
| 4,292,899 | A * | 10/1981 | Steffen | 108/51.11 |
| 4,715,294 | A * | 12/1987 | Depew | 108/57.17 |
| 5,076,175 | A * | 12/1991 | Whatley, II | 108/51.11 |
| 5,351,628 | A * | 10/1994 | Breezer et al. | 108/56.1 |
| 5,417,167 | A * | 5/1995 | Sadr | 108/57.19 |
| 5,673,629 | A * | 10/1997 | Ginnow | 108/57.17 |
| 5,868,080 | A * | 2/1999 | Wyler et al. | 108/57.25 |
| 5,960,721 | A * | 10/1999 | Huetteman et al. | 108/57.17 |
| 6,101,955 | A * | 8/2000 | Salce | 108/51.11 |
| 6,216,608 | B1 * | 4/2001 | Woods et al. | 108/57.25 |
| 6,584,915 | B1 * | 7/2003 | Rogers | 108/56.1 |
| 6,622,642 | B2 * | 9/2003 | Ohanesian | 108/57.25 |
| 7,487,730 | B2 * | 2/2009 | Hedstrom | 108/56.3 |
| 8,033,228 | B2 * | 10/2011 | Haney et al. | 108/132 |
| 8,261,673 | B2 * | 9/2012 | Ingham | 108/51.11 |
| 8,291,837 | B2 * | 10/2012 | Kirkpatrick | 108/56.1 |
| 2006/0005746 | A1 * | 1/2006 | Gouldin, Jr. | 108/51.11 |
| 2006/0278137 | A1 * | 12/2006 | Shimada | 108/51.11 |
| 2007/0017423 | A1 * | 1/2007 | Ingham | 108/57.17 |
| 2008/0156234 | A1 * | 7/2008 | van de Camp | 108/51.11 |
| 2011/0132237 | A1 * | 6/2011 | Brandt et al. | 108/51.11 |
| 2011/0303128 | A1 * | 12/2011 | Linares | 108/51.3 |

* cited by examiner

*Primary Examiner* — Jose V Chen
(74) *Attorney, Agent, or Firm* — Ido Tuchman

(57) ABSTRACT

A system may include a bottom deck to a shipping platform, and a block joined to the bottom deck. The system may also include a top deck joined to the block. The system may further include a T1 lead-board structurally different from the top deck fastened to an edge of the top deck.

7 Claims, 9 Drawing Sheets

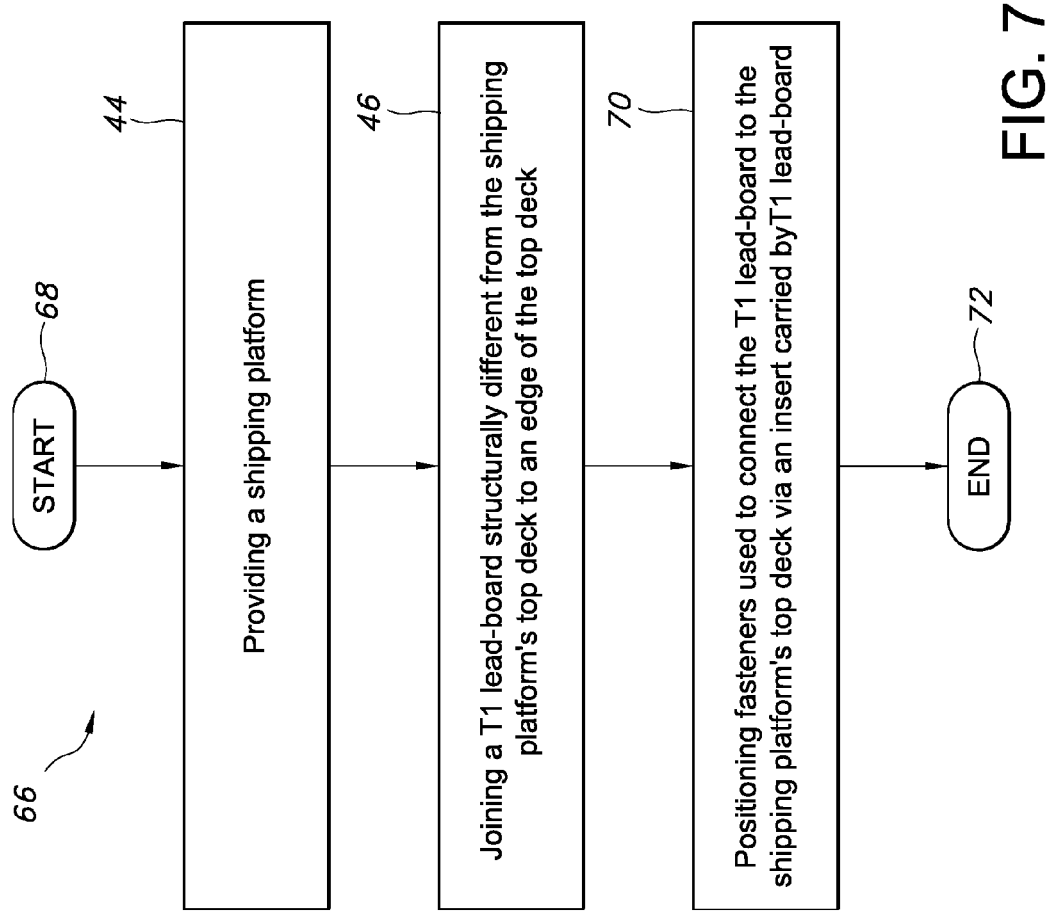

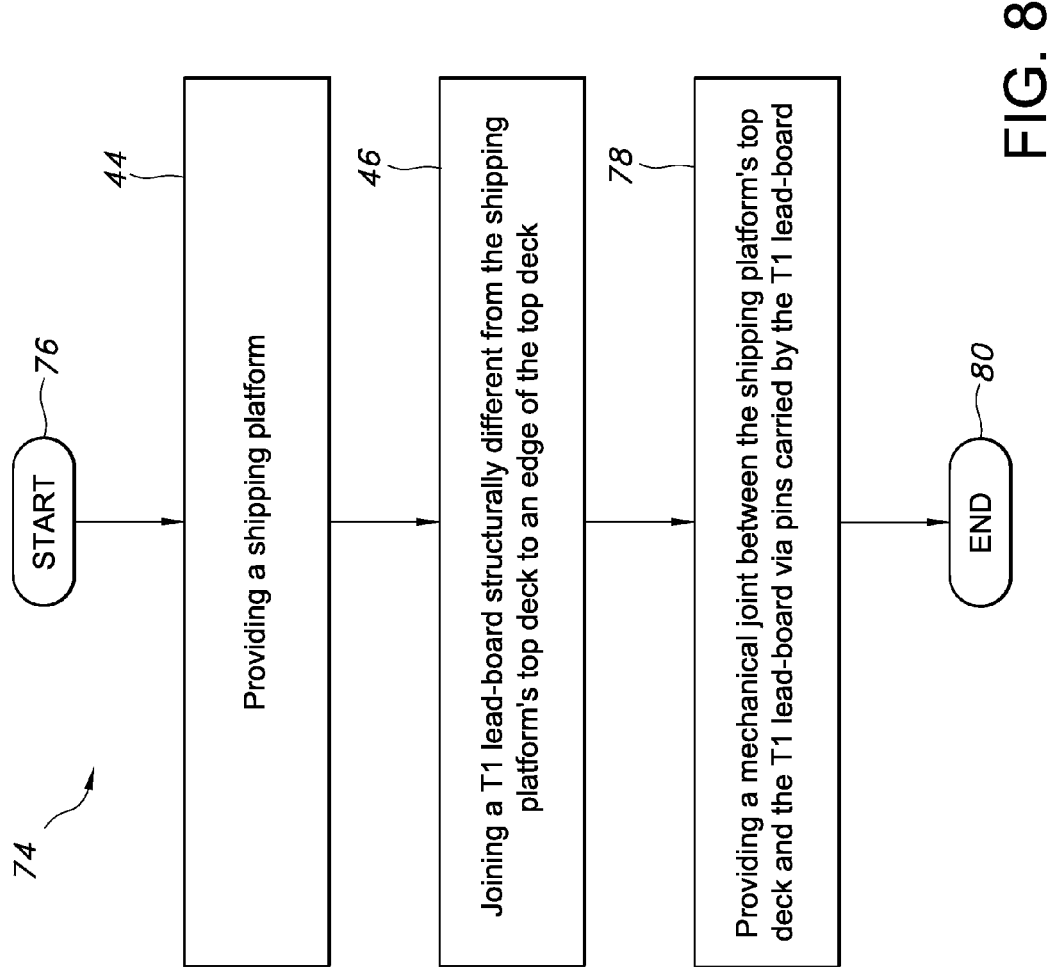

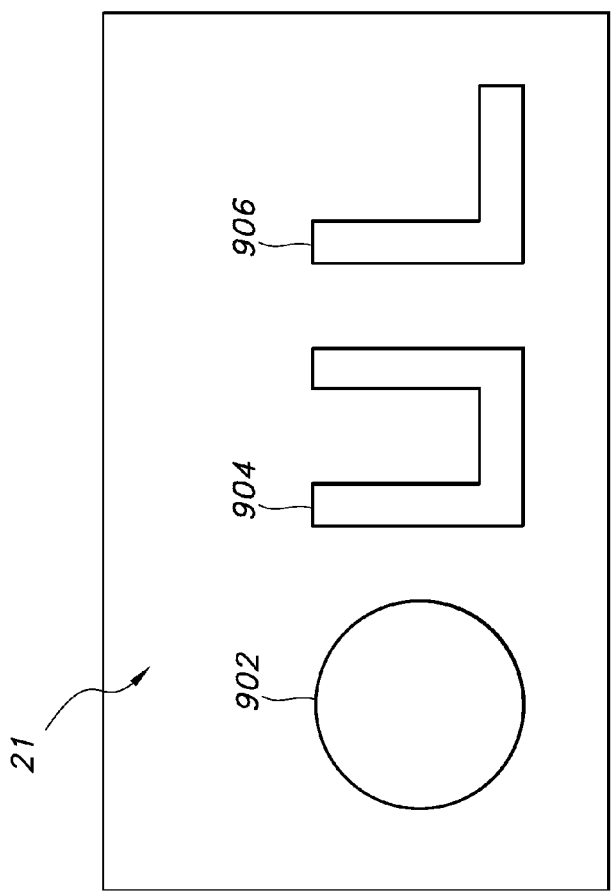

T1 LEAD-BOARD FOR A SHIPPING PLATFORM

RELATED APPLICATIONS

This application claims the benefit of co-pending U.S. Provisional Patent Application No. 61/576987, filed on Dec. 17, 2011, entitled "Improved T1 Lead-board for a Shipping Platform", the entire subject matter of which is incorporated herein by reference in its entirety.

BACKGROUND

Shippers, manufacturers, wholesalers, retailers, and/or the like move merchandise, materials, and/or the like (e.g. load, to customers, end-users, and/or the like) on shipping platforms (e.g. pallet, containers, and/or the like). This technique of bulk shipping may reduce the cost related to moving the load when compared to non-bulk shipping methods. As a result, all parties in the distribution chain may benefit from lower shipping costs due to this bulk shipping technique.

There are a number of issues with the above described technique. One issue is that shipping platforms are exposed to a harsh operating environment. Another issue is the shipping platform may be restricted in any number of ways by regulatory and/or standardization requirements.

SUMMARY

According to one embodiment, a system may include a bottom deck to a shipping platform, and a block joined to the bottom deck. The system may also include a top deck joined to the block. The system may further include a T1 lead-board structurally different from the top deck fastened to an edge of the top deck.

The T1 lead-board may comprise plastic, plastic-metal composite, metal, and/or plywood. The T1 lead-board may comprise lightening holes and/or lightening reliefs.

The top deck may comprise wood. The metal component of the plastic-metal composite may provide structural support for the plastic T1 lead-board.

The metal component may comprise a round bar, U-channel, and/or L-channel. The system may additionally include an insert carried by the T1 lead-board to position fasteners used to connect the T1 lead-board to the top deck.

The insert may comprise metal inserts, higher density plastic inserts, and/or metal screen inserts. The T1 lead-board may include pins to provide a mechanical joint between the top deck and the T1 lead-board.

Another aspect of the embodiments is a method. The method may include providing a shipping platform. The method may also include joining a T1 lead-board structurally different from the shipping platform's top deck to an edge of the top deck. The T1 lead-board may comprise plastic, plastic-metal composite, metal, and/or plywood, and the shipping platform's top deck may comprise wood.

The method may further include adding lightening holes and/or lightening reliefs to the T1 lead-board. The method may additionally include providing structural support for the plastic T1 lead-board via a metal component.

The method may also include positioning fasteners used to connect the T1 lead-board to the shipping platform's top deck via an insert carried by the T1 lead-board. The method may further include providing a mechanical joint between the shipping platform's top deck and the T1 lead-board via pins carried by the T1 lead-board.

An alternative embodiment of the system may include a bottom deck to a shipping platform. The system may also include a block joined to the bottom deck, and a wooden top deck joined to the block. The system may further include a T1 lead-board fastened to an edge of the top deck where the T1 lead-board comprises plastic, plastic-metal composite, metal, and/or plywood.

BRIEF DESCRIPTION OF THE DRAWINGS

FIG. 7 is a flowchart illustrating method aspects according to the method of FIG. 4.

FIG. 8 is a flowchart illustrating method aspects according to the method of FIG. 4.

FIG. 9 shows method aspects according to the method of FIG. 4.

DETAILED DESCRIPTION

Embodiments will now be described more fully hereinafter with reference to the accompanying drawings, in which preferred embodiments are shown. Like numbers refer to like elements throughout.

Figure 1:
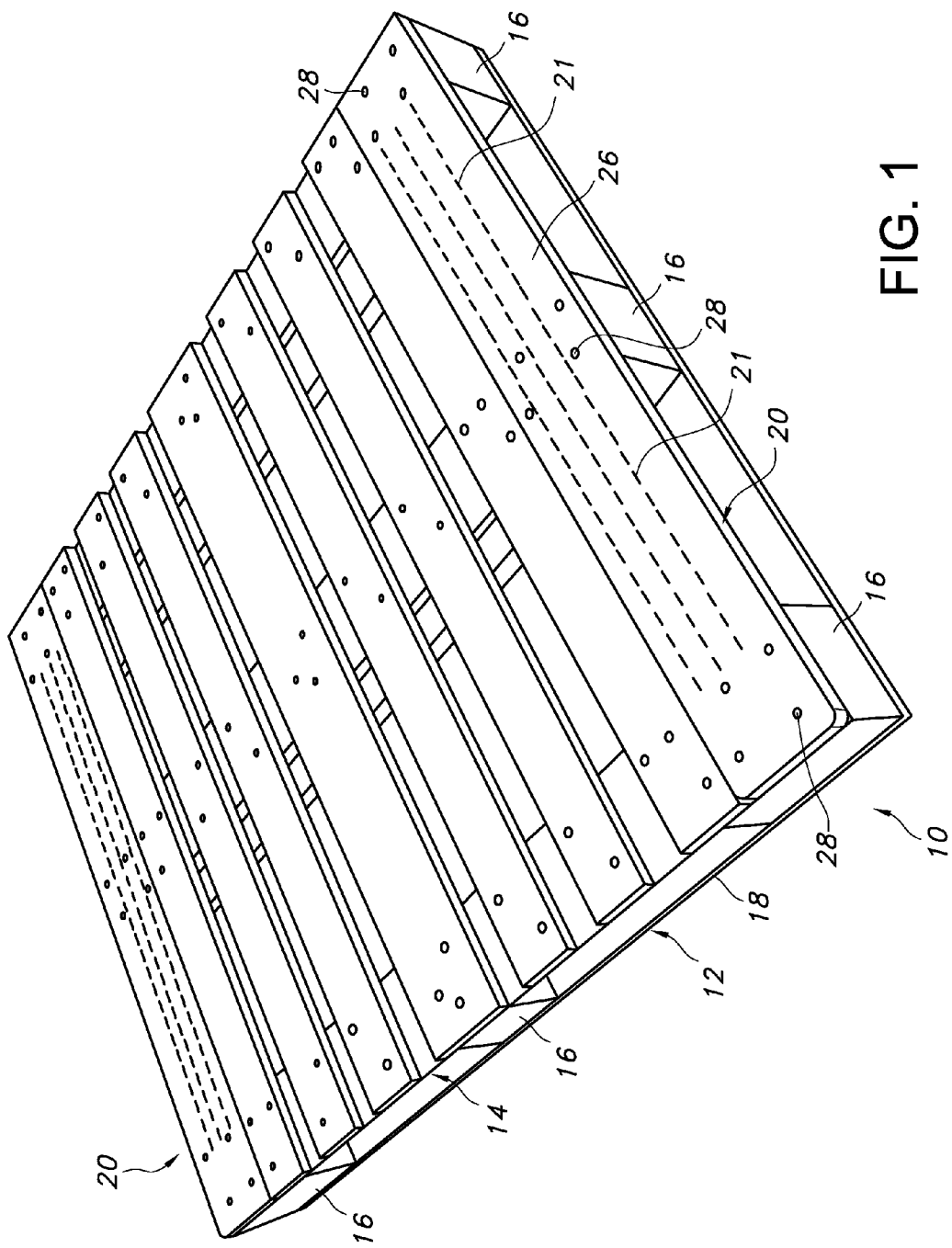
FIG. 1 illustrates a T1 lead-board for a shipping platform in accordance with the invention.
Figure 2:
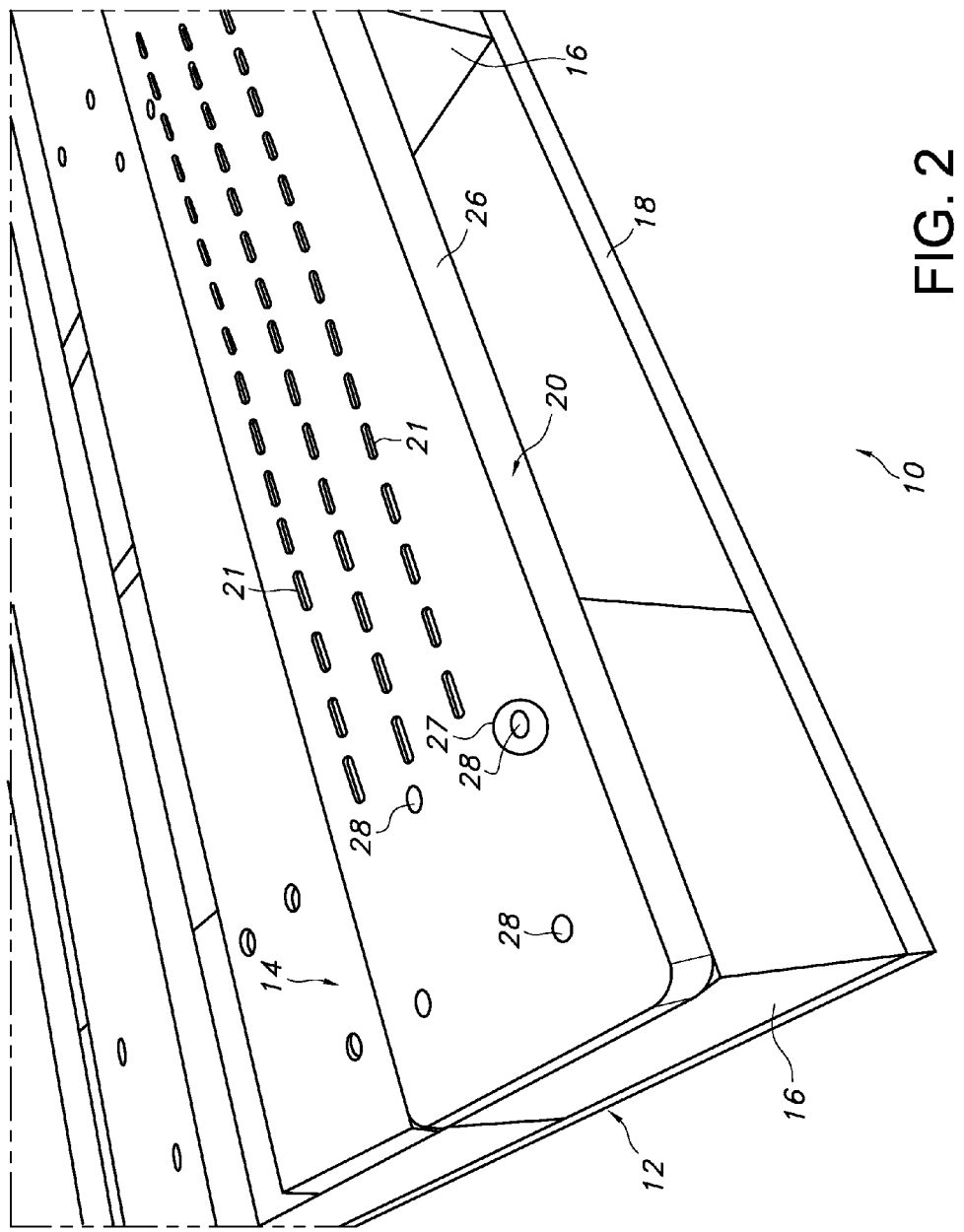
FIG. 2 illustrates a close-up of the T1 lead-board of FIG. 1.

With reference to FIGS. 1 and 2, a system 10 for a shipping platform 12, e.g. pallet, is initially described. In this embodiment, the shipping platform 12 is fabricated out of a top deck 14 joined to blocks 16, that is joined to a bottom deck 18. The top deck 14, the blocks 16, and/or the bottom deck 18 comprise wood, metal, plastic, composite materials, and/or the like.

In one embodiment, the top deck 14, the blocks 16, and/or the bottom deck 18 utilizes fasteners such as nails, screws, dowels, and/or the like for their joinery. This enables the top deck 14, the blocks 16, and/or the bottom deck 18 of the pallet 12 to be assembled and/or repaired as needed.

In one embodiment, the top deck 14 comprises a T1 lead-board 20 on either end of the top deck 14. The T1 lead-board 20 comprises plywood, plastic, plastic metal hybrid, metal, composites, and/or the like attached to a wood top deck 14. In another embodiment, the T1 lead-board 20 may include lightening holes 21 and/or lightening reliefs 22 that reduce the overall weight of the T1 lead-board. The lightening reliefs 22 are similar to the lightening holes 21, but without going all the way through both sides of the lightened surface.

Figure 3:
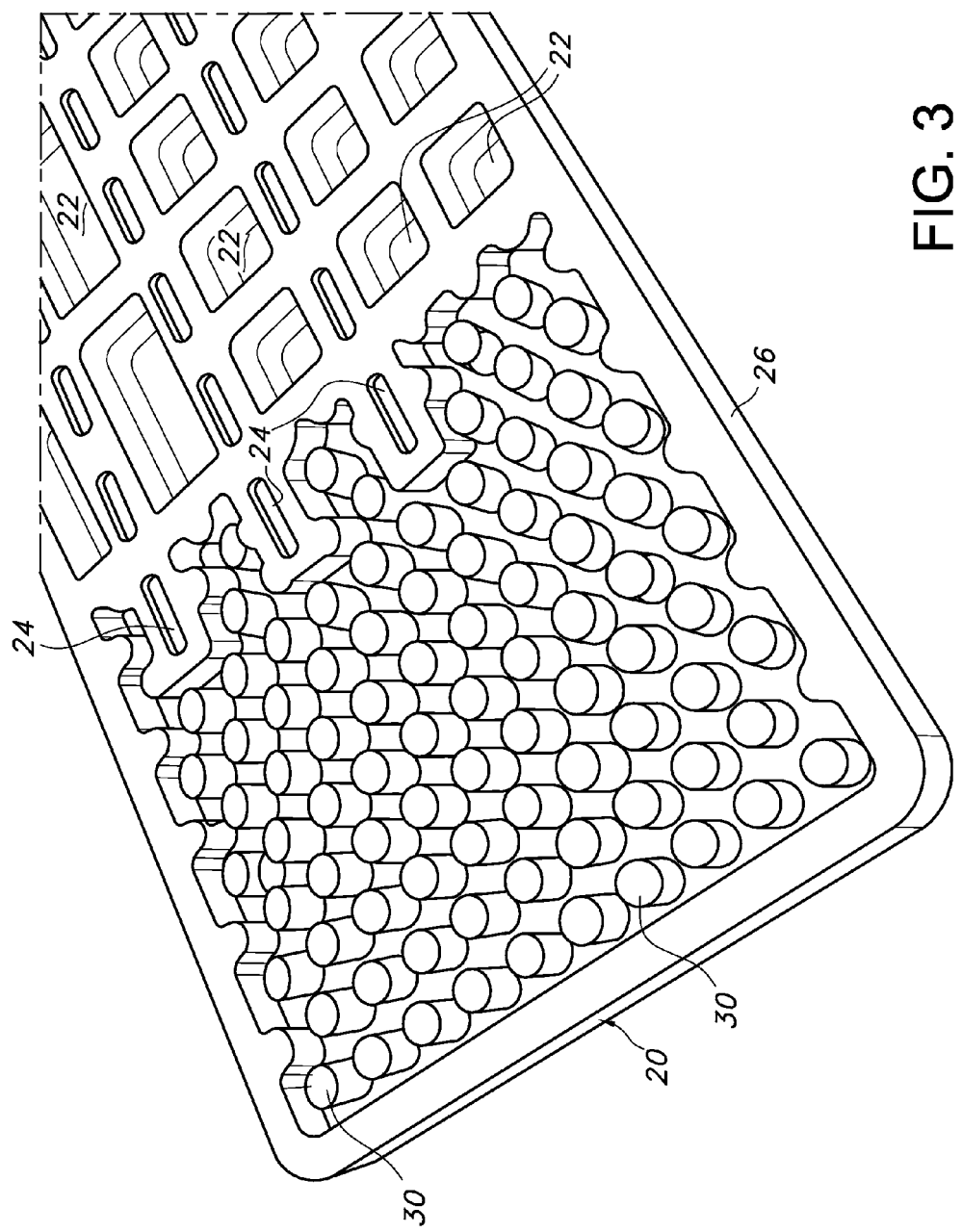
FIG. 3 illustrates a close-up of the end of the T1 lead-board used in FIG. 1.

With additional reference to FIG. 3, in one embodiment, the T1 lead-board 20 comprises a plastic metal hybrid board where the metal component 24 is a structural support for the plastic body 26. For instance, the metal component 24 utilizes ⅛" thick metal bars to provide stiffness. In another embodiment, the metal components 24 are only ½" high.

In one embodiment, the metal component 24 has other shapes such as a U-channel, L-channel, and/or the like. In another embodiment, the metal component 24 will deflect nails.

In one embodiment, the T1 lead-board 20 comprises a plastic hybrid board where an insert 27 is positioned on the T1 lead-board 20 mold where fasteners 28 are applied to the T1 lead-board so as to position the fastener heads, e.g. nails heads, properly. In other words, the insert 27 keeps the fasteners 28 from penetrating too deeply into the surface of the T1 lead-board 20.

In one embodiment, the insert 27 comprises an added component to the plastic T1 lead-board 20, such as metal inserts, higher density plastic inserts, a metal screen inserted into the T1 lead-board, and/or the like. For example, a plastic T1 lead-board 20 with high density plastic second shot to stop nails heads 28.

In one embodiment, the T1 lead-board 20 includes pins 30 on each end that provide a mechanical joint as well as a friction joint because the pins 30 are seated into the wood member it is joined to. The pins 30 also serve as to reduce the overall weight of the T1 lead-board 20 in a manner similar to lightening holes, but without going all the way through both sides of the lightened surface. The T1 lead-board 20 provides increased durability because of its ability to absorb impulse forces less destructively than a plain wooden lead-board.

The system 10 addresses durability issues of shipping platforms 12 while also keeping the shipping platforms within standardization requirements. In other words, system 10 changes the dimensions of a shipping platform 10 very little, if at all. As a result, system 10 can be deployed with little impact to the overall system in which the shipping platforms 12 flow. In addition, the system 10 also provides a retrofit option that can be deployed to improve an existing pool of shipping platforms 12.

In one embodiment, the system 10 includes a bottom deck 18 to a shipping platform 12, and a block 16 joined to the bottom deck. The system 10 also includes a top deck 14 joined to the block 16. The system 10 further includes a T1 lead-board 20 structurally different from the top deck 14 fastened to an edge of the top deck 14. In other words, the T1 lead-board 20 comprises a portion of the top deck 14. In another embodiment, the In one embodiment, the T1 lead-board 20 comprises plastic, plastic-metal composite, metal, and/or plywood. In another embodiment, the T1 lead-board 20 comprises lightening holes 21 and/or lightening reliefs 22.

In one embodiment, the top deck 14 comprises wood. In another embodiment, the metal component 24 of the plastic-metal composite provides structural support for the plastic T1 lead-board 20.

In one embodiment, the metal component 24 comprises a round bar 902, U-channel 904, and/or L-channel 906, as shown in FIG. 9. In another embodiment, the system 10 additionally includes an insert 27 carried by the T1 lead-board 20 to position fasteners 28 used to connect the T1 lead-board 20 to the top deck 14.

In one embodiment, the insert 27 comprises metal inserts, higher density plastic inserts, and/or metal screen inserts. In another embodiment, the T1 lead-board 20 includes pins 30 to provide a mechanical joint between the top deck 14 and the T1 lead-board.

Figure 4:
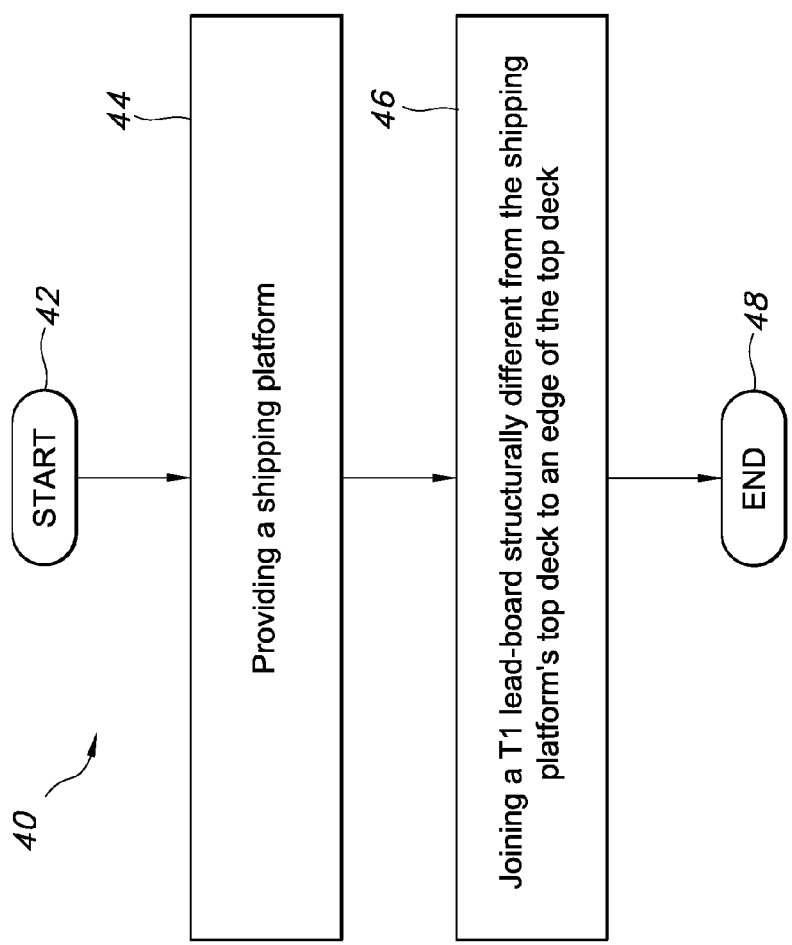
FIG. 4 is a flowchart illustrating method aspects according to embodiments.

Another aspect of the embodiments is a method, which is now described with reference to flowchart 40 of FIG. 4. The method begins at Block 42 and may include providing a shipping platform at Block 44. The method may also include joining a T1 lead-board structurally different from the shipping platform's top deck to an edge of the top deck at Block 46. The method ends at Block 48.

Figure 5:
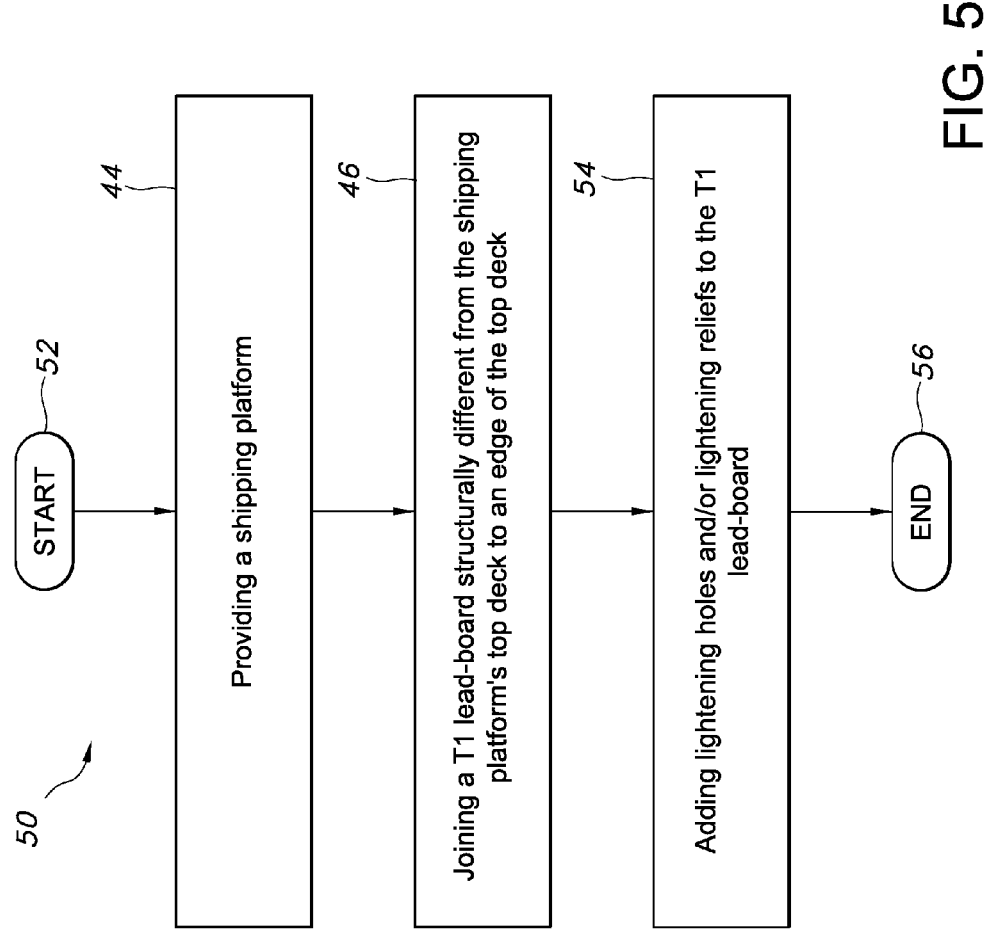
FIG. 5 is a flowchart illustrating method aspects according to the method of FIG. 4.

In another method embodiment, which is now described with reference to flowchart 50 of FIG. 5, the method begins at Block 52. The method may include the steps of FIG. 4 at Blocks 44 and 46. The method may additionally include adding lightening holes and/or lightening reliefs to the T1 lead-board at Block 54. The method ends at Block 56.

Figure 6:
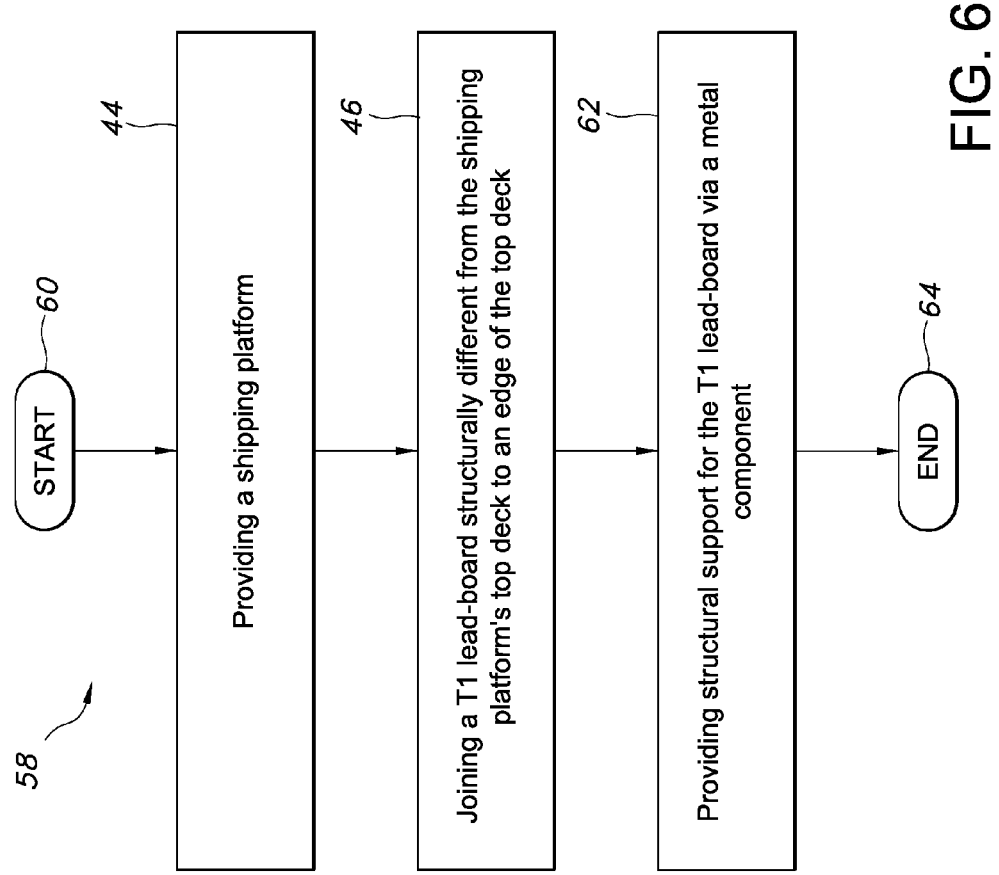
FIG. 6 is a flowchart illustrating method aspects according to the method of FIG. 4.

In another method embodiment, which is now described with reference to flowchart 58 of FIG. 6, the method begins at Block 60. The method may include the steps of FIG. 4 at Blocks 44 and 46. The method may further include providing structural support for the T1 lead-board via a metal component at Block 62. The method ends at Block 64.

In another method embodiment, which is now described with reference to flowchart 66 of FIG. 7, the method begins at Block 68. The method may include the steps of FIG. 4 at Blocks 44 and 46. The method may further include positioning fasteners used to connect the T1 lead-board to the shipping platform's top deck via an insert carried by the T1 lead-board at Block 70. The method ends at Block 72.

In another method embodiment, which is now described with reference to flowchart 74 of FIG. 8, the method begins at Block 76. The method may include the steps of FIG. 4 at Blocks 44 and 46. The method may additionally include providing a mechanical joint between the shipping platform's top deck and the T1 lead-board via pins carried by the T1 lead-board at Block 78. The method ends at Block 80.

An alternative embodiment of the system 10 includes a bottom deck 18 to a shipping platform 12. The system 10 also includes a block 16 joined to the bottom deck 18, and a wooden top deck 14 joined to the block. The system 10 further include a T1 lead-board 20 fastened to an edge of the top deck 20 where the T1 lead-board comprises plastic, plastic-metal composite, metal, and/or plywood.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiment and the practical application, and to enable others of ordinary skill in the art to understand the various embodiments with various modifications as are suited to the particular use contemplated.

It should be noted that in some alternative implementations, the functions noted in a flowchart block may occur out of the order noted in the figures. For instance, two blocks shown in succession may, in fact, be executed substantially concurrently, or the blocks may sometimes be executed in the reverse order, depending upon the functionality involved because the flow diagrams depicted herein are just examples. There may be many variations to these diagrams or the steps (or operations) described therein without departing from the spirit of the embodiments. For example, the steps may be performed concurrently and/or in a different order, or steps may be added, deleted, and/or modified. All of these variations are considered a part of the claimed embodiments.

While the preferred embodiment have been described, it will be understood that those skilled in the art, both now and in the future, may make various improvements and enhancements which fall within the scope of the claims which follow. These claims should be construed to maintain the proper protection for the embodiments first described.

What is claimed is:

1. A system comprising:
   a bottom deck to a shipping platform;
   a block joined to the bottom deck;
   a top deck joined to the block; and
   a T1 lead-board structurally different from the top deck fastened to an edge of the top deck;
   wherein the T1 lead-board comprises at least one of plastic, plastic-metal composite, metal, and plywood; and
   wherein the metal component of the plastic-metal composite provides structural support for the plastic T1 lead-board.

2. The system of claim 1 wherein the T1 lead-board comprises at least one of lightening holes and lightening reliefs.

3. The system of claim 1 wherein the top deck comprises wood.

4. The system of claim 1 wherein the metal component comprises at least one of a round bar, U-channel, and L-channel.

5. The system of claim 1 further comprising an insert carried by the T1 lead-board to position fasteners used to connect the T1 lead-board to the top deck.

6. The system of claim 1 wherein the insert comprises one of metal inserts, higher density plastic inserts, and metal screen inserts.

7. The system of claim 1 wherein the T1 lead-board includes pins to provide a mechanical joint between the top deck and the T1 lead-board.

* * * * *